United States Patent Office 3,558,693
Patented Jan. 26, 1971

3,558,693
PREPARATION OF ALKYLSULFONATES
Burton M. Rein, Piscataway, and John D. Behun, Scotch Plains, N.J., assignors to Mobil Oil Corporation, a corporation of New York
No Drawing. Filed Aug. 19, 1966, Ser. No. 573,481
Int. Cl. C07c 87/30
U.S. Cl. 260—501.15                                  8 Claims

ABSTRACT OF THE DISCLOSURE

A process of preparing alkylsulfonates and their quaternary ammonium salts is disclosed. The process comprises the reaction of a quaternary ammonium bisulfite with an olefin.

---

This invention relates to an improved method for the synthesis of alkylsulfonates.

The production of alkylsulfonates by reaction of an inorganic bisulfite with an olefin in the presence of a solvent and a reaction-initiating agent has heretofore been described. Emphasis has been placed on the controlled gradual introduction of the bisulfite compound, which is usually a salt like ammonium or sodium bisulfite, in order to secure a more rapid completion of the reaction, it being stated that without such controlled introduction, long reaction times are required, extending say from 10 to 100 hours. These efforts, in turn, involved a careful supervision over the bisulfite concentration. Thus, it was not unusual, according to these processes, to slowly add bisulfite to the reaction mixture over a period of 3 hours and then to continue heating for a like period or longer. Also, in order to check the rate of addition, aliquot portions of the reaction mixture were periodically withdrawn and tested as a prerequisite to the maintenance of the bisulfite concentration within desired limits. Such periodic tests were done as often as every 10 minutes.

It may be seen that these prior processes are marked by tedious techniques which result in increasing the cost of the product. All too frequently they prolong the reaction well beyond desired times.

According to the present invention, it is proposed to eliminate completely the need for such careful control, including both the gradual addition of bisulfite and the periodic testing of the reaction mixture. In some cases, shorter times are possible in which to perform the reaction; thus a homogeneous reaction mixture is attainable in a space of minutes, followed by high conversions and yields inside of 2 or 3 hours. A further advantage lies in the production not only of alkylsulfonates but also valuable intermediates in the form of quaternary ammonium alkylsulfonates. The former are useful as biodegradable detergents, while the latter appear suitable for use as dry cleaning solvent additives, gasoline and lube oil additives, fabric softeners, antistatic agents, plastics additives, corrosion inhibitors, and agricultural chemicals.

In essence, the improved method of the invention comprises employing a tetraalkylammonium bisulfite as the source of bisulfite ions, and in particular, forming such compound in situ in the reaction mixture. Olefin is added to the mixture, and the whole is dissolved in an anhydrous solvent. All reactants are from the beginning used in substantially stoichiometric amounts, and in a single addition, there being no gradual or stepwise addition of reactants. The pH is brought to a value in the range of 6 to 9, a free radical initiator is added, and the reaction is then carried out at reflux temperature. As indicated, water is excluded from the mixture. At the conclusion of the reaction, the solvent is removed, and the product, comprising quaternary ammonium alkylsulfonate, may be extracted from the mixture. Such product may be used as is, or it may be converted, as by acidifying, to an alkylsulfonic acid, in which step a tetraalkylammonium salt of the acidifying acid is formed, then recovered, converted to the hydroxide, and reused in the process. To obtain an alkylsulfonate salt, the alkylsulfonic acid may be neutralized with an inorganic base.

Considering the invention in further detail, the bisulfite reactant, as noted, is a quaternary ammonium alkyl bisulfite, $R_1R_2R_3R_4NHSO_3$, in which the R groups may be the same or different and may be alkyl, substituted alkyl, aryl, or substituted aryl. Where the R is substituted alkyl or aryl, the substituent or substituents, which should be inert under reaction conditions, may comprise groups such as hydroxy, chloro, fluoro, cyano, methoxy, and the like. The R groups preferably have up to 6 or 7 carbons but may have more, going up to 12 or more carbons. Suitable R groups include methyl, ethyl, propyl, butyl, pentyl, hexyl, phenyl, benzyl, tolyl, xylyl, and the like; and suitable substituted R groups include hydroxyethyl, chloropropyl, cyanobutyl, chlorophenyl, fluorophenyl, cyanophenyl, methoxyphenyl, and the like. As indicated, the bisulfite compound is formed in situ in the reaction mixture, as by introducing the appropriate tetraalkylammonium hydroxide and sulfur dioxide to the reaction zone and reacting the same. Suitably these reactants may first be dissolved in the anhydrous solvent before introduction to the reaction zone. If the bisulfite compound is used in preisolated form, the yield of alkylsulfonate is only a small fraction of that obtainable when the compound is prepared in situ. The concentration of bisulfite compound, as described, is substantially stoichiometric with respect to the amount of olefin, but may range from 0.8 to 1.5 moles per mole of olefin.

The olefin reactant may be any suitable linear, branched chain, or cyclic olefin, substituted or unsubstituted, and having terminal or internal unsaturation. If substituted, the substituent or substituents, as exemplified by alkyl, phenyl, chloro, fluoro, cyano, etc., should be inert under reaction conditions. The olefin may be a single olefin in substantially pure form, or mixed with other materials, or mixed with other olefins. Preferably the olefin is one having 2 to 22 carbon atoms. More preferably, the olefin is an alpha-olefin, is linear or only slightly branched, has 6 to 10, 12, or 14 carbons, and is substantially pure. With respect to molecular weight, it is found that the higher molecular weight olefins tend to react more slowly and require more severe reaction conditions.

The solvent may be any inert compound available in substantially anhydrous state and capable of dissolving all reactants, including the initiating agent and the product, without necessity for addition of water. A preferred solvent is methanol. Other suitable solvents are low molecular weight alkanols like ethanol, propanol, isopropanol, butanol, etc. Also ethers like triethylene gylcol dimethyl ether; cyclic ethers like dioxane; organic amines like pyridine, hexanolamine, etc. Also tetrahydrofuran, dimethylformamide, dimethylacetamide, dimethylsulfoxide, hexamethylphosphoramide, chlorobenzene, dichlorobenzene, etc. A preferred class of solvents includes those boiling at temperatures below 200° C. The amount of solvent should be sufficient to readily dissolve the reactants.

The reaction initiator is conventional, comprising an organic or inorganic peroxide and including such representative compounds as benzoyl peroxide, t-butyl perbenzoate, t-butyl pertoluate, di-t-butyl peroxide, t-butyl perphthalate, t-butyl perlaurate, t-butyl peracetate, t-butyl t-amyl peroxide, hydrogen peroxide, sodium peroxide, and the like. Another group of initiators comprises inorganic salts of transition metals such as iron, cobalt, nickel, manganese, and the like. The reaction does not proceed to any substantial extent in the absence of the initiator.

Regarding the reaction conditions, the temperature, as mentioned, is preferably refluxing temperature, which may be that of any component of the reaction mixture, preferably that of a component boiling in the range of 50 to 200° C. The pH of the reaction mixture should be in the range of 6 to 9, and may be adjusted by use of tetraalkylammonium hydroxide for raising the pH or sulfur dioxide for lowering the pH, these being the reactants for making the tetraalkylammonium bisulfite in situ. Each may be used per se or dissolved in the solvent. Reaction times generally depend on the olefin, lower molecular weight olefins requiring shorter times and vice versa. Preferred reaction times are in the range of ½ to 6 hours, more preferably up to 3 hours. The pressure is preferably atmospheric. Conversions of up to 100% are obtainable, based on the amount of olefin charged, and are obtained for many of the olefins. It is of course possible and feasible to accept lesser conversions for the sake of obtaining the product more quickly; for example, the reaction may be halted after a 40 or 50% conversion, and the product recovered, in order to perform the reaction within a span of only 1 or 2 hours. Generally, it is preferred to secure a conversion of at least 40 or 50%. Yields of product, comprising quaternary ammonium alkylsulfonate, of up to 98 mole percent, based on the olefin converted, may be realized, and generally are at least 70%. In terms of alkylsulfonate salt, or of alkylsulfonic acid, the yields are in the range of 60 to 98%, based on the quaternary ammonium alkylsulfonate.

Although the method is illustrated by the examples, it may be well to note that the reactants may be mixed in any order, and as indicated, stoichiometric or substantially stoichiometric quantities are used from the beginning, except that the quaternary ammonium hydroxide and the sulfur dioxide, preferably employed in solution in the solvent, may be added during the reaction to adjust the pH. Before application of heat, the pH is adjusted, and the heat is applied so as to reflux the mixture over a desired period of time the length of which may be in accordance with predetermined conversions and yields. At the conclusion of the reaction, heating is stopped and the solvent may be removed under reduced pressure, leaving a solid reaction mixture. This may then be extracted with a selective solvent, such as acetone, chloroform, dichloromethane, benzene, chlorobenzene, toluene, xylene, isopropanol, n-butanol, etc., which takes up the product, i.e. the quaternary ammonium alkylsulfonate. The extract may then be heated to evaporate the solvent, and the product recovered and taken as such, or it may be converted to an alkylsulfonic acid by acidifying. To illustrate the acidification step, the extract, after removal of the solvent, may be dispersed in a suitable medium, for example it may be suspended in ether, and then acidified as by introducing gaseous HCl for one or more hours. The resulting mixture is then filtered to remove precipitated quaternary ammonium chloride, which was formed during acidification, and the filtrate is recovered; it contains the alkylsulfonic acid. The latter may be taken and used as such, or it may be converted to a salt, such as the sodium salt, by adding sodium carbonate or other suitable compound to the filtrate and extracting with a conventional solvent, such as butanol, to take up the sodium alkylsulfonate.

In addition to ether, any conventional medium which is a substantial non-solvent for the quaternary ammonium alkylsulfonate may be used in the extract dispersing step. Another procedure for dispersing the extract, comprising an alternative to the described ether suspension step, involves dissolving the quaternary ammonium alkylsulfonate in a suitable solvent, followed by acidification. This solvent should preferably be one in which the quaternary ammonium chloride, formed after acidification with HCl, is insoluble.

It will be understood that acidification can be performed with other conventional agents besides HCl.

The solid quaternary ammonium chloride is recovered and converted to the hydroxide in any suitable way, as by passing the same, preferably dissolved in methanol, through a strong base anion exchange resin like Amberlyt-A21 or Dowex 21–K, which are resins of the quaternary ammonium salt type. The hydroxide, in turn, can then be used to form the quaternary bisulfite in situ, as described.

The conversion to the alkylsulfonate salt, also termed a metal alkylsulfonate, can also be accomplished by treating the quaternary ammonium alkylsulfonate with an appropriate ion exchange resin. The quaternary ammonium cation can be recovered by regeneration of the resin and recycled as described above.

Of interest is the fact that the quaternary ammonium alkylsulfonates exhibit greater solubility in organic solvents than the corresponding sodium alkylsulfonates. For example, tetramethylammonium decylsulfonate was soluble in benzene and acetone, in which the corresponding sodium decylsulfonate was insoluble, and it had greater solubility in chloroform; both compounds were soluble in water and methanol.

The invention may be illustrated by the following examples.

EXAMPLE 1

This example illustrates the preparation of tetramethylammonium n-decylsulfonate.

Tetramethylammonium bisulfite (TMAB) was prepared in situ by the addition of sulfur dioxide to a methanol solution of tetramethylammonium hydroxide (TMAH), there being formed 341 g. or 0.8 mole of TMAB. This represented a 36% by weight solution of TMAB in methanol. To this solution there was added 70 g. or 0.50 mole of decene-1 and 1 g. of t-butyl perbenzoate, and the mixture, which had a pH of 8 to 9, was refluxed over a period of 3 hours, at the end of which the olefin could not be detected in the anhydrous reaction mixture by vapor phase chromatography. The methanol solvent was then removed from the mixture under reduced pressure, leaving a resulting solid material which was extracted with acetone. From the acetone extraction there was isolated 145 g. of crude tetramethylammonium n-decylsulfonate (TMADS), comprising 97% yield, based on the olefin charged. The conversion was about 100%, based on the olefin.

EXAMPLE 2

The work of Example 1 was repeated, except that the reactant quantities were doubled, and except that the refluxing was carried out over a period of only one hour. The yield of product was 82%, based on olefin charged.

EXAMPLE 3

This example illustrates the preparation of sodium n-decylsulfonate.

A portion of the TMADS product of Example 1 was mixed with ether to form a finely dispersed suspension, and this was acidified by introducing gaseous hydrogen chloride, thereby forming n-decylsulfonic acid, the yield of which was 83% by weight, and tetramethylammonium chloride (TMAC). The latter came down as a precipitate and was removed by filtration, then dissolved in methanol and passed through a strong base anion exchange resin (Amberlyt-A21) which quantitatively converted the TMAC to the hydroxide (TMAH). Thus the TMAH was available for further use, since it could be reacted with sulfur dioxide to form TMAB.

A portion of the n-decylsulfonic acid was treated with aqueous sodium carbonate solution to form sodium n-decylsulfonate, which was obtained by extraction with n-butanol in 83% yield, based on the TMADS.

EXAMPLE 4

The synthesis of tetramethylammonium n-decylsulfonate, as described in Example 1 was repeated except that no t-butyl perbenzoate was used. The reaction mixture was refluxed for 19 hours but remained heterogeneous. Only 5 g. of product were isolated.

EXAMPLE 5

Employing the reaction procedure of Example 1, except that the quaternary ammonium hydroxide was trimethylbenzylammonium hydroxide and the olefin was n-tetradecene-1, there was prepared trimethylbenzylammonium n-tetradecylsulfonate. After a reaction time of 30 hours, the crude yield was 71% for 100% conversion.

EXAMPLE 6

This example may illustrate the importance of maintaining the pH of the reaction mixture in the range of 6 to 9. Two runs were made in which decene-1 and tetramethylammonium bisufite (TMAB) (prepared in situ) were reacted at refluxing temperature (69° C.) in the presence of methanol as solvent and t-butyl perbenzoate as catalyst. In each run 0.02 mole of olefin was used. To form the TMAB, 0.031 mole of tetramethylammonium hydroxide (TMAH) were reacted with 0.029 mole of sulfur dioxide. The TMAH was used as a 24% methanol solution, while the sulfur dioxide was used as a 14% methanol solution. The initial pH in run No. 1 was 8 to 9, and it was noted that the reaction mixture became homogeneous within 10 minutes after the start of refluxing. After 40 minutes, the conversion was 50%, based on the olefin used up. In run No. 2, 0.049 mole of TMAH was reacted with 0.030 mole of sulfur dioxide. The pH was 10, and as may be apparent, an additional amount of TMAH was used to make the reaction mixture more basic. After refluxing for 1 hour, the mixture was still heterogeneous.

In two additional runs the effect of a pH below 6 was examined. Both runs were the same except for the pH. In one run, the pH was between 5 and 6, and the highest conversion was 55%, obtained after 22 hours. In the other run the pH was between 7 and 8, and the highest conversion was 84%, obtained after 6 hours. In the latter run the conversion was 67% after only 2.5 hours. In such latter run it may be mentioned that 94% of the olefin used up was converted to TMADS.

In still another pair of runs, carried out like the last two except that the sulfur dioxide was introduced as a gas, the pH in one run was 6.5, resulting in a 60% conversion after only 1⅓ hours and a yield of TMADS of 86% based on the amount of olefin converted. In the other run the pH was between 4 and 5, and it required 3.5 hours to obtain a conversion of 61%.

In other work, tetramethylammonium n-tetradecylsulfonate and tetramethylammonium n-octadecylsulfonate were prepared. Of interest is the fact that the former compound was obtained in 98% yield, based on the olefin charged.

It will be understood that the invention is capable of obvious variations without departing from its scope.

In the light of the foregoing description, the following is claimed:

1. In reacting an unsubstituted alpha-olefin containing from 2 to 22 carbon atoms, capable of sulfonation and reactive at an elevated sulfonation temperature with a bisulfite compound in solution in an inert solvent containing a reaction-initiating agent to form an alkylsulfonate by addition, the improvement which comprises adding sulfur dioxide to a substantially anhydrous solution of a quaternary ammonium hydroxide wherein each of the four organic radicals contains up to 12 carbon atoms and is individually of the group consisting of alkyl, aryl, aralkyl, alkaryl radicals and alkyl or aryl radicals substituted by at least one hydroxy, halogen, cyano or methoxy substituent to form a substantially stoichiometric amount of the corresponding quaternary ammonium bisulfite in situ, thereafter adding said agent and a substantially stoichiometric amount of said olefin and heating the resulting substantially anhydrous mixture under refluxing conditions while maintaining a pH value in the range of 6 to 9 to produce a quaternary ammonium alkylsulfonate.

2. Process of claim 1 wherein the quaternary ammonium hydroxide is a tetraalkylammonium hydroxide, and the product is a tetraalkylammonium alkylsulfonate.

3. Process of claim 2 wherein the alkyl groups of the tetraalkylammonium hydroxide each have up to 7 carbons, and wherein said olefin has up to 14 carbons.

4. A process according to claim 1 in which said mixture is heated to a temperature between 50 and 200° C. for refluxing.

5. A process according to claim 1 in which said olefin is added in a single addition, said mixture is heated under refluxing conditions for a period of ½ to 6 hours and the yield of said quaternary ammonium alkylsulfonate is at least 70% by weight, based on the olefin converted.

6. A process according to claim 1 in which said solution contains a low molecular weight alkanol as the solvent.

7. A process according to claim 1 in which the quaternary ammonium hydroxide is of the group consisting of tetramethylammonium hydroxide and trimethylbenzylammonium hydroxide and the olefin is an unsubstituted linear alpha-olefin containing from 10 to 14 carbon atoms.

8. Process of claim 1 comprising acidifying the quaternary ammonium alkylsulfonate to form an alkylsulfonic acid and a quaternary ammonium salt, filtering the resulting mixture to remove said salt therefrom, recovering the alkylsulfonic acid solution and converting the quaternary ammonium salt to the hydroxide thereof, and recirculating the hydroxide to the reaction zone for reuse therein.

References Cited
UNITED STATES PATENTS

| | | | |
|---|---|---|---|
| 2,623,881 | 12/1952 | Erdtman | 260—567.6 |
| 2,504,411 | 4/1950 | Harman | 260—51.3 |

OTHER REFERENCES

Gilbert: Sulfonation and Related Reactions, Interscience Publishers, New York, pp. 45, 148–151 (1965).

LEON ZITVER, Primary Examiner

M. W. GLYNN, Assistant Examiner

U.S. Cl. X.R.

260—513, 567.6